US006944744B2

(12) United States Patent
Ahmed et al.

(10) Patent No.: US 6,944,744 B2
(45) Date of Patent: Sep. 13, 2005

(54) APPARATUS AND METHOD FOR INDEPENDENTLY SCHEDULABLE FUNCTIONAL UNITS WITH ISSUE LOCK MECHANISM IN A PROCESSOR

(75) Inventors: Ashraf Ahmed, Austin, TX (US); Michael A. Filippo, Manchaca, TX (US); James K. Pickett, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 457 days.

(21) Appl. No.: 10/228,929

(22) Filed: Aug. 27, 2002

(65) Prior Publication Data

US 2004/0181652 A1 Sep. 16, 2004

(51) Int. Cl.[7] ................................................ G06F 9/30
(52) U.S. Cl. ........................................ 712/20; 712/214
(58) Field of Search ............................ 712/20, 22, 214

(56) References Cited

U.S. PATENT DOCUMENTS

| | | | |
|---|---|---|---|
| 4,748,585 A | | 5/1988 | Chiarulli et al. |
| 4,891,787 A | * | 1/1990 | Gifford ....................... 712/205 |
| 5,287,292 A | | 2/1994 | Kenny et al. |
| 5,475,856 A | * | 12/1995 | Kogge ......................... 712/20 |
| 5,490,059 A | | 2/1996 | Mahalingaiah et al. |
| 5,758,176 A | * | 5/1998 | Agarwal et al. ............... 712/23 |
| 5,915,232 A | | 6/1999 | McMinn |
| 5,951,689 A | | 9/1999 | Evoy et al. |
| 6,098,030 A | | 8/2000 | McMinn |
| 6,308,252 B1 | * | 10/2001 | Agarwal et al. ............... 712/22 |
| 6,484,253 B1 | * | 11/2002 | Matsuo ....................... 712/212 |

FOREIGN PATENT DOCUMENTS

GB            1409466 A      10/1975

OTHER PUBLICATIONS

"Superscalar Processor Architecture Using Flexible Execution Unit" IBM Technical Disclosure Bulletin, vol. 37, No. 2B, Feb. 1, 1994, pp. 699–702, XP000434005.
Search Report for PCT/US 03/22189 mailed Jun. 5, 2004.

* cited by examiner

*Primary Examiner*—Eric Coleman
(74) *Attorney, Agent, or Firm*—Robert C. Kowert; Meyertons, Hood, Kivlin, Kowert & Goetzel, P.C.

(57) ABSTRACT

A functional unit of a processor may be configured to operate on instructions as either a single, wide functional unit or as multiple, independent narrower units. For example, an execution unit may be scheduled to execute an instruction as a single double-wide execution unit or as two independently schedulable single-wide execution units. Functional unit portions may be independently schedulable for execution of instructions operating on a first data type (e.g. SISD instructions). For single-wide instructions, functional unit portions may be scheduled independently. An issue lock mechanism may lock functional unit portions together so that they form a single multi-wide functional unit. For certain multi-wide instructions (e.g. certain SIMD instructions), an instruction operating on a multi-wide or vector data type may be scheduled so that the full multi-wide operation is performed concurrently by functional unit portions locked together as a one wide functional unit.

24 Claims, 7 Drawing Sheets

APPARATUS AND METHOD FOR INDEPENDENTLY SCHEDULABLE FUNCTIONAL UNITS WITH ISSUE LOCK MECHANISM IN A PROCESSOR

BACKGROUND OF THE INVENTION

1. Field of the Invention

This invention relates to processors, and more specifically, to processors supporting instructions for different sized data types, such as processors supporting both single instruction single data (SISD) instructions and single instruction multiple data (SIMD) instructions.

2. Description of the Related Art

Since the introduction of the 8086 microprocessor, several successive generations of the X86 instruction set architecture, or more briefly, the X86 architecture, have been developed, with further developments occurring on a continuous basis. With each new generation of the X86 architecture, microprocessor manufacturers have attempted to maintain backward compatibility in order to allow software developed for previous generations of the architecture to run on the most current generation. Maintaining this compatibility has forced a number of compromises in successive generations of the architecture. When expanding an existing processor architecture, architects must often face several difficult choices. The expansion of an existing processor architecture may require a balancing act between maintaining backward compatibility and making the desired upgrades to increase the performance for the next generation.

Expanding an existing processor architecture may include the implementation of many architectural innovations. One method of expanding the architecture may be the addition of new instructions to the instruction set. New instructions may often require specific new types of operands. Such operands may be of various data widths, and may be compatible with data types (e.g. integer, floating point, vector, etc.) that may be operated on by the processor's execution unit(s).

Recent instruction-set architectures (ISA), and extensions thereof, have included instructions whose operands may include vector data types. These types of instructions are often referred to as SIMD (single instruction, multiple data) instructions. Examples of instruction-set architectures employing SIMD instructions are MDMX™, VIS™, MMX™, 3Dnow!™ and AltiVec™. SIMD instructions are instructions which may have operands comprising at least two sub-operands, wherein each of the sub-operands is an independent value. For example, a SIMD operand may be a 128-bit value comprising four 32-bit values. The SIMD instruction may define an operation to be performed concurrently on the sub-operands. The operation may be performed on each sub-operand independently of the other sub-operands. Typically, carry values generated by adding the sub-operands are not carried from one sub-operand to the next. An ADD instruction on 128-bit SIMD operands, each comprising four 32-bit sub-operands may result in four 32-bit addition operations. In this example, a single SIMD instruction may accomplish that which would require four different SISD instructions to accomplish. Thus, supporting SIMD instruction may allow for increased code density.

Potential performance gains may be achieved by supporting SIMD instructions in a processor. Performance gains created by the use of SIMD instructions largely result from the increased execution throughput provided by the processor's arithmetic functional units that produce multiple output data (e.g. vector output datatypes) in the same amount of time normally required to produce a single output datum. The most straightforward way to achieve these performance benefits when implementing a SIMD instruction-set in a processor, is to design the processor's functional units to be able to atomically manipulate the base data type used in these instructions. Thus, in an example in which SIMD instructions operate on 128-bit operands, the processor's functional units would be designed to operate on 128-bit wide datatypes.

For example, a processor supporting both 64-bit SISD instructions and 128-bit SIMD instructions may schedule instructions to a 128-bit functional unit. The functional unit would thus be capable of manipulating either single 64-bit operands for SISD instructions or 128-bit operands (two 64-bit suboperands) for SIMD instructions. However, this implementation leads to utilization inefficiencies. During the times in which the functional unit is operating on 64-bit datatypes, only half of the functional unit is being utilized. Only when the functional unit is operating on 128-bit datatypes is the entire functional unit fully utilized.

Thus, in a superscalar processor wider datatypes (e.g. for SIMD instructions) may be supported by widening the data path of the functional units. In order to widen the data path, additional logic may be required to be implemented, thereby consuming a significant amount of area on the processor die. The additional area consumed by widening the data path may result in the need for significant changes to the layout of the other units on the processor die. Furthermore, when narrower data types are processed (e.g. for SISD instructions), the functional units are under-utilized.

SUMMARY

A functional unit of a processor may be configured to operate on instructions as either a single, wide functional unit or as multiple, independent narrower units. For example, an execution unit may be scheduled to execute an instruction as a single double-wide execution unit or as two independently schedulable single-wide execution units. In one embodiment, execution unit portions may be independently schedulable for execution of instructions operating on a first data type (e.g. SISD instructions). Thus, for single-wide instructions, functional unit portions may be scheduled independently.

An issue lock mechanism may lock functional unit portions together so that they form a single multi-wide functional unit. Thus, for certain multi-wide instructions (e.g. certain SIMD instructions), an instruction operating on a multi-wide or vector data type may be scheduled so that the full multi-wide operation is performed concurrently by functional unit portions locked together as a one wide functional unit. For example, a SIMD instruction operating on a 128 bit data type including two 64 bit sub-operands may be issued to an execution unit with two 64 bit execution unit portions locked together so that one 64 bit sub-operand is operated on by one execution unit portion while the other 64 bit sub-operand is operated on by another execution unit portion. The two halves of the SIMD operands may be scheduled by scheduler portions respectively, where the scheduler portions are coordinated so that the SIMD instruction and operands are issued concurrently to the two execution unit portions.

A processor may include an instruction scheduler configured to receive instructions and schedule the instructions for issuance. Some instructions may specify a first data type having a first bit-width and other instructions may specify a second data type having a second bit-width. A functional unit of the processor may be configured to receive instructions issued from the scheduler and to perform an operation according to each issued instruction. The functional unit may include multiple functional unit portions. Each functional unit portion may be configured to operate on operands of the first data type, and the functional unit portions may be configured to be locked together to operate on operands of the second data type. The scheduler may be configured to independently schedule instructions (e.g. SISD instructions) to separate ones of the functional unit portions and atomically schedule other instructions (e.g. SIMD instructions) to the functional unit with the functional unit portions locked together. In one embodiment, the scheduler may be configured to atomically schedule a SIMD instruction to the functional unit with the functional unit portions locked together when the SIMD instruction is issued so that each sub-operand of the SIMD operand is concurrently operated on by one of the plurality of functional unit portions.

Figure 1:
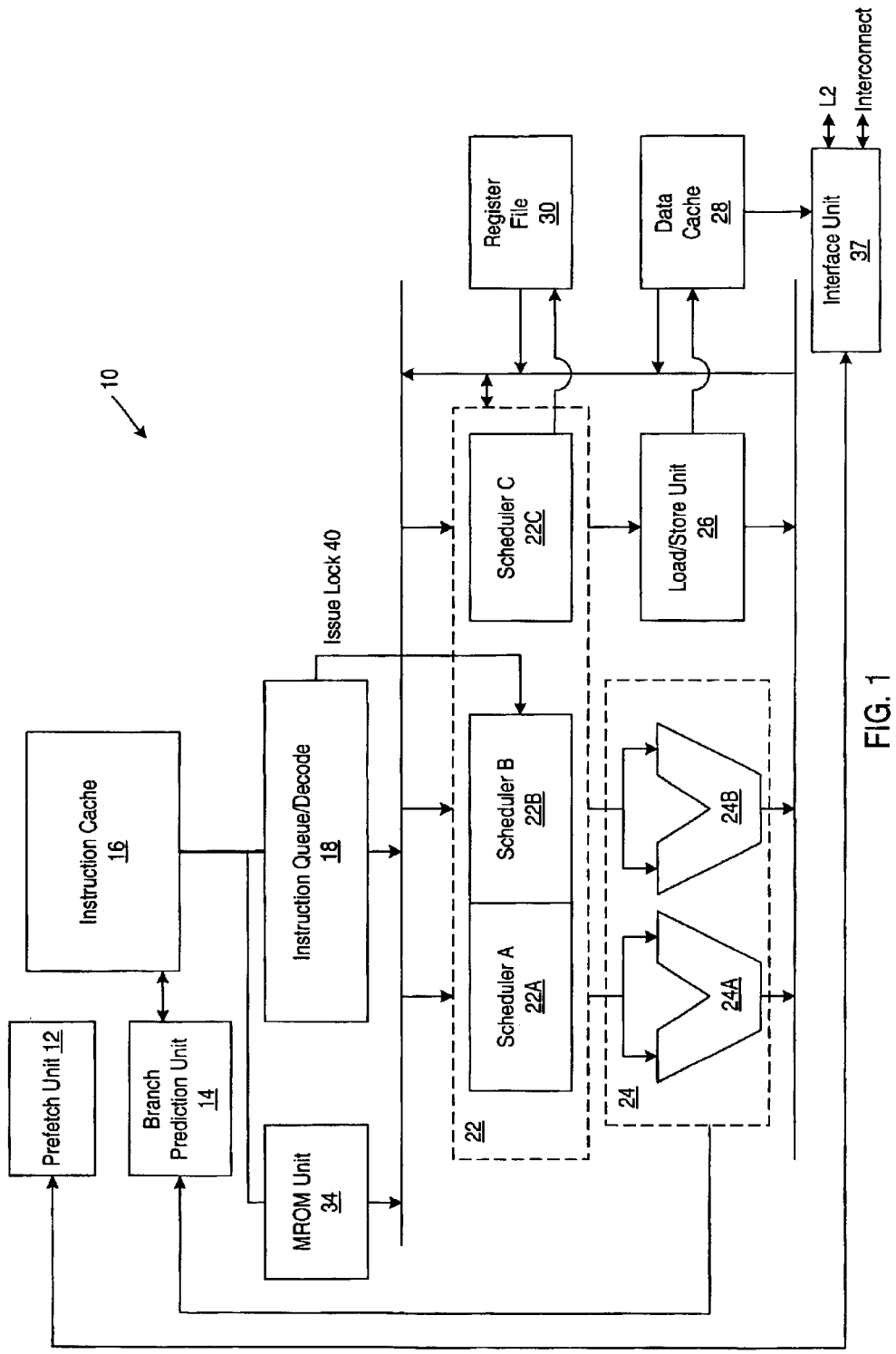
FIG. 1 is a block diagram of one embodiment of a processor with a functional unit schedulable as multiple independent portions or as a single unit, according to one embodiment.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF EMBODIMENTS OF THE INVENTION

Turning now to FIG. 1, a block diagram of one embodiment of a processor 10 is shown. Other embodiments are possible and contemplated. As shown in FIG. 1, processor 10 may include a prefetch/predecode unit 12, a branch prediction unit 14, an instruction cache 16, an instruction queue/decode unit 18, a scheduler 22, a functional unit 24, a load/store unit 26, a data cache 28, a register file 30, an microcode (MROM) unit 34, and a bus interface unit 37.

Prefetch/predecode unit 12 is coupled to receive instructions from bus interface unit 37, and is further coupled to instruction cache 16 and branch prediction unit 14. Similarly, branch prediction unit 14 is coupled to instruction cache 16. Still further, branch prediction unit 14 is coupled to scheduler 22 and functional unit 24. Instruction cache 16 is further coupled to MROM unit 34 and instruction queue/decode unit 18. Instruction queue/decode unit 18 is in turn coupled to scheduler 22. Scheduler 22 is further coupled to respective execution functional units 24 and load/store unit 26. Additionally, instruction queue/decode unit 18 and scheduler 22 are coupled to register file 30. Functional unit 24 is coupled to load/store unit 26, register file 30, and scheduler 22 as well. Data cache 28 is coupled to load/store unit 26 and to bus interface unit 37. Bus interface unit 37 is further coupled to an L2 interface to an L2 cache and a bus. Finally, MROM unit 34 is coupled scheduler 22.

Instruction cache 16 may be a high speed cache memory provided to store instructions. Instructions may be fetched from instruction cache 16 and dispatched to instruction queue/decode unit 18. For example, instruction cache 16 may be configured to store up to 64 kilobytes of instructions in a 2 way set associative structure having 64 byte lines (a byte comprises 8 binary bits). Alternatively, any other desired configuration and size may be employed. For example, it is noted that instruction cache 16 may be implemented as a fully associative, set associative, or direct mapped configuration.

Instructions may be stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. In some embodiments, as prefetch/predecode unit 12 transfers instructions to instruction cache 16, prefetch/predecode unit 12 may generates predecode bits for each byte of the instructions. The predecode bits may form tags indicative of the boundaries of each instruction. The predecode tags may also convey additional information such as whether a given instruction may be directly decoded or whether the instruction is executed by invoking a microcode procedure controlled by MROM unit 34. In one embodiment, instructions which may be directly decoded in instruction queue/decode unit 18 are referred to as "fast path" instructions. Other instructions may be MROM instructions. In one embodiment, the type of instruction may be determined by examining the predecode tag. Still further, prefetch/predecode unit 12 may be configured to detect branch instructions and to store branch prediction information corresponding to the branch instructions into branch prediction unit 14. Other embodiments may employ any suitable predecode scheme or no predecode at all.

In one embodiment, MROM instructions are instructions which are determined to be too complex for decode by instruction queue/decode unit 18. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of decoded fast path instructions scheduler 22. In another embodiment, MROM unit 34 may dispatch fast path instructions to a decode portion of instruction queue/decode unit 18.

Processor 10 may employ branch prediction in order to speculatively fetch instructions subsequent to conditional branch instructions. Branch prediction unit 14 is included to perform branch prediction operations. In one embodiment, branch prediction unit 14 employs a branch target buffer which caches branch target addresses and corresponding taken/not taken predictions cache line or cache line portion in instruction cache 16. Prefetch/predecode unit 12 may determines initial branch targets when a particular line is predecoded. Subsequent updates to the branch targets corresponding to a cache line may occur due to the execution of instructions within the cache line. Instruction cache 16 may provide an indication of the instruction address being fetched, so that branch prediction unit 14 may determine which branch target addresses to select for forming a branch prediction. Instruction queue/decode unit 18 and execution functional unit 24 may provide update information to branch prediction unit 14. Instruction queue/decode unit 18 may detect branch instructions which were not predicted by branch prediction unit 14. Functional unit 24 executes the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch may be discarded from the various units of processor 10. In an alternative configuration, branch prediction unit 14 may receive branch misprediction information from reordering logic in scheduler 22. A variety of suitable branch prediction algorithms may be employed by branch prediction unit 14.

Instructions fetched from instruction cache 16 are conveyed to instruction queue/decode unit 18. In one embodiment, as instructions are fetched from instruction cache 16, the corresponding predecode data may be scanned to provide information to instruction queue/decode unit 18 (and to MROM unit 34) regarding the instructions being fetched. Instruction queue/decode unit 18 may decode instructions and route register operand information register file 30 and scheduler 22.

In one embodiment processor 10 may be a superscalar microprocessor that supports out of order execution. The scheduler 22, or a reorder buffer, may keep track of the original program sequence for register read and write operations in order to implement register renaming, allow for speculative instruction execution and branch misprediction recovery, and facilitate precise exceptions. If a branch prediction is incorrect, the results of speculatively-executed instructions along the mispredicted path may be invalidated before they are committed to register file 30. Similarly, if a particular instruction causes an exception, instructions subsequent to the particular instruction may be discarded. In this manner, exceptions may be "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded.

Decoded instruction control values and immediate or displacement data are provided from instruction queue/decode unit 18 to scheduler 22. Scheduler 22 may include a separate scheduler portion 22A, 22B, 22C for each execution unit portion 24A, 24B and load/store unit 26. Scheduler portions 22A, 22B may hold instructions until they are ready to be issued to execution functional unit 24. Upon decode of a particular instruction, if a required operand is a register location, register address information may be routed to register file 30 simultaneously. If the instructions require one or more memory operations to be performed, scheduler portion 22C may issue the memory operations to load/store unit 26.

As noted earlier, scheduler 22 stores instructions until the instructions are executed by the corresponding execution unit 24. In one embodiment, when an instruction(s) is executed by execution unit 24, the result(s) of that instruction is forwarded directly to scheduler 22 for any pending instruction that is waiting for that result (this technique is commonly referred to as "result forwarding"). An instruction may be selected for execution and passed to execution unit 24 during the clock cycle that the associated result is forwarded. Scheduler 22 routes the forwarded result to the functional unit 24 in this case.

In one embodiment, portions of execution unit 24 may be configured to perform integer arithmetic operations of addition and subtraction, as well as shifts, rotates, logical operations, and branch operations. The operations are performed in response to the control values decoded for a particular instruction by instruction queue/decode unit 18. In some embodiments, a floating point execution unit portions may also be employed to accommodate floating point operations. Execution unit portions may operate independently upon different SISD instructions during a clock cycle or be locked together to operate on one SIMD instruction, as described in more detail below.

Results produced by execution unit 24 are sent to register file if a register value is being updated, and to load/store unit 26 if the contents of a memory location are changed. In one embodiment, scheduler 22 may maintain register renaming for physical register file 30. In other embodiments, a reorder buffer may be used to ensure that results are retired to register file 30 in the correct order.

Load/store unit 26 may provides an interface between execution unit 24 and data cache 28. Load/store unit 26 may also perform dependency checking for load memory operations against pending store memory operations to ensure that data coherency is maintained. A memory operation is a transfer of data between processor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the processor's address translation mechanism.

Data cache 28 may be a high speed cache memory provided to temporarily store data being transferred between load/store unit 26 and the main memory subsystem. It is understood that data cache 28 may be implemented in a variety of specific memory configurations, including a set associative configuration, a fully associative configuration, a direct-mapped configuration, and any suitable size of any other configuration.

In one particular embodiment of processor 10 employing the x86 processor architecture, instruction cache 16 and data cache 28 are linearly addressed and physically tagged. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. The physical address is compared to the physical tags to determine a hit/miss status.

Bus interface unit 37 is configured to communicate between processor 10 and other components in a computer system via a bus or point-to-point interface. Any suitable interconnect structure may be used including packet-based, unidirectional or bi-directional links, etc. An optional L2 cache interface may be employed as well for interfacing to a level two cache, which may be internal or external to the processor FIG. 2 focuses on a portion of microprocessor 10 including instruction queue/decode unit 18, scheduler portions 22A and 22B and execution unit 24. Execution unit 24 is configured to execute instructions as either a single, wide execution unit or as multiple, independent narrower units. For example, execution unit 24 may be scheduled to execute an instruction as a single double-wide execution unit or as two independently schedulable single-wide execution units 24A and 24B. In one embodiment, execution unit portions 24A and 24B may be independently schedulable for execution of instructions operating on 64-bit data types (e.g. SISD instructions). Instruction queue 19 may queues one or more instruction stream for scheduler 22. In one embodiment, instruction queue 19 may be part of an instruction queue/decode unit 18 as shown in FIG. 1. Instruction queue 19 is illustrated as having three instruction queue streams, represented by the three columns in instruction queue 19 of FIG. 2. In other embodiments, instruction queue 19 may queue a different number of instruction streams.

Instructions received from instruction queue/decode unit 18, for example, may be scheduled by scheduler portion 22A for execution unit portion 24A and scheduled by scheduler portion 22B for execution unit portion 24B. Thus, for single-wide instructions, execution unit portions 24A and 24B may be scheduled independently. Execution unit portions may also be independently scheduled for portions of SIMD instructions that do not require concurrent execution. For example, two 64-bit portions of a 128-bit SIMD instruction may be independently scheduled for execution unit portions 24A and 24B.

An issue lock mechanism 21 may lock execution unit portions 24A and 24B together so that they form a single double-wide (e.g. 128 bit) execution unit 24. Thus, for certain double wide instructions (e.g. certain SIMD instructions), an instruction operating on a double-wide or vector data type may be scheduled so that the full double wide operation is performed concurrently by execution units 24A and 24B locked together as a one wide execution unit. For example, a SIMD instruction operating on a 128 bit data type including two 64 bit sub-operands may be issued to execution unit 24 with execution unit portions 24A and 24B locked together so that one 64 bit sub-operand is operated on by execution unit 24A while the other 64 bit sub-operand is operated on by execution unit portion 24B. The two halves of the SIMD operands may be scheduled by scheduler portions 22A and 22B respectively, where the scheduler portions are coordinated so that the SIMD instruction and operands are issued concurrently to the two execution unit portions 24A and 24B.

In one embodiment, the issue lock mechanism 21 may be implemented as part of instruction queue/decode unit 18 to determine when an instruction is a wide instruction for which execution unit portions 24A and 24B should be locked together. This determination may be made when the instruction is decoded. If instruction queue/decode unit 18 determines that an instruction is a wide instruction for which the execution unit portions 24A and 24B are to be locked together, an issue lock signal 40 may be asserted to scheduler 22 when the wide instruction is dispatched to scheduler 22. In other embodiments a tag may be associated with such instructions to indicate the need for issue lock on execution. In yet other embodiments the issue lock mechanism 21 may be implemented as part of prefetch unit 12. A predecode may determine, among other things, if an instruction is a double-wide instruction for which issue lock is desired. The prefetch unit 12 may associate a tag or some other indication of the need for issue lock with the instruction so that when the instruction is ultimately issued it will issue to execution unit portions 24A and 24B locked together. Alternatively, any other suitable mechanism may be employed for determining when an instruction is an instruction for which execution portions 24A and 24B are to be locked together upon issuance of the instruction. In other embodiments, the function of the issue lock mechanism 21 may be performed at any stage of the processor at or upstream from the instruction issue stage.

Note also that not all wide instructions require issue lock. For example, some SIMD instructions may be split into multiple sub-instructions scheduled separately. A SIMD instruction specifying 128 bit operands having 64 bit sub-operands may be scheduled as two separate instructions operating on 64 bit operands. These sub-instructions may be scheduled independently for the two execution unit portions 24A and 24B. However, it may still be desirable for performance reasons in some situations to lock the execution units together for wide data types. Other SIMD instructions may need, or may execute more efficiently, if the entire SIMD operand(s) is operated on concurrently. For these SIMD instructions, the issue lock mechanism may be used so that all sub-operands of the SIMD operands are issued together and operated on in the same execution cycle by execution unit portions locked together. For example, some SIMD instructions may specify dependencies between sub-operands, such as certain shuffle or rotate instructions. Issue lock may be specified for SIMD instructions with dependencies between sub-operands.

Figure 2:
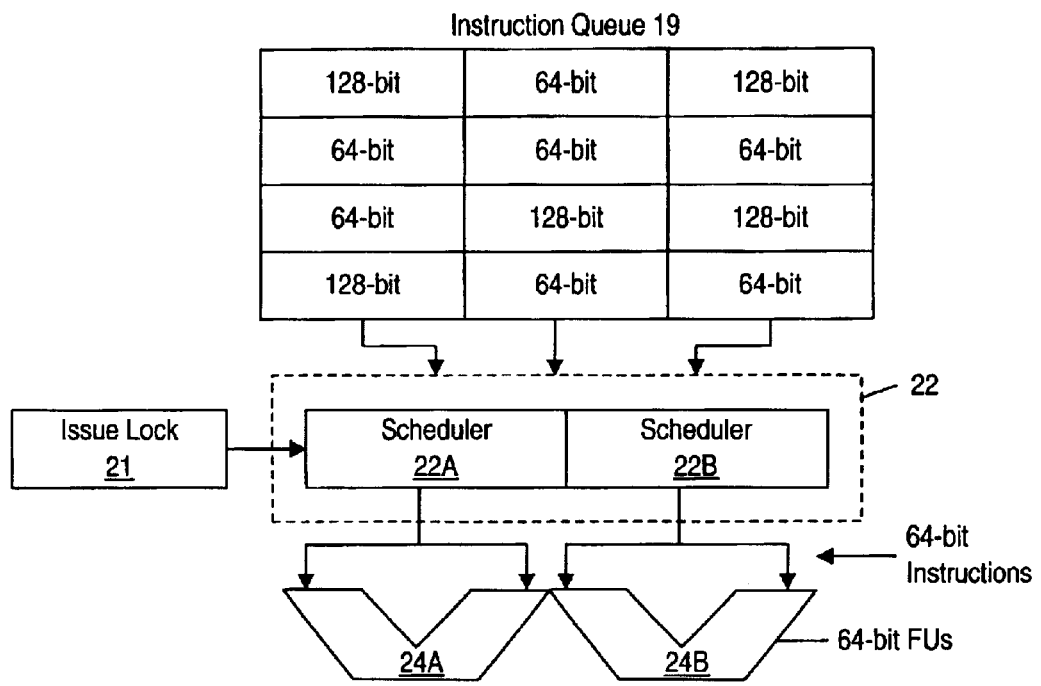
FIG. 2 illustrates a portion of a processor including an instruction queue, scheduler and functional unit, according to one embodiment.

The particular processor architecture illustrated in FIGS. 1 and 2 is merely one example of an embodiment of the present invention. Other embodiments may be based on other processor architectures in which it is desirable to operate on different sized data types. In virtually any processor architecture, portions of the processor pipeline may be provided that may be scheduled either independently for narrower data types or locked together to operate concurrently on larger data types. Note also that while the invention has been described in terms of having execution unit portions that may be scheduled independently or locked together, the invention may also be applied to other stages of the processor pipeline. For example, load store unit 26 may be configured to handle load store operations separately for 64-bit operands or support a locked mode in which loads or stores for 128-bit data types are handled atomically. Thus, for essentially any functional unit or stage of a processor the functional unit or stage may have individually schedulable portions for smaller data types, and those portions may be lock-scheduled to operate as an atomic unit for larger data types.

Figure 3:
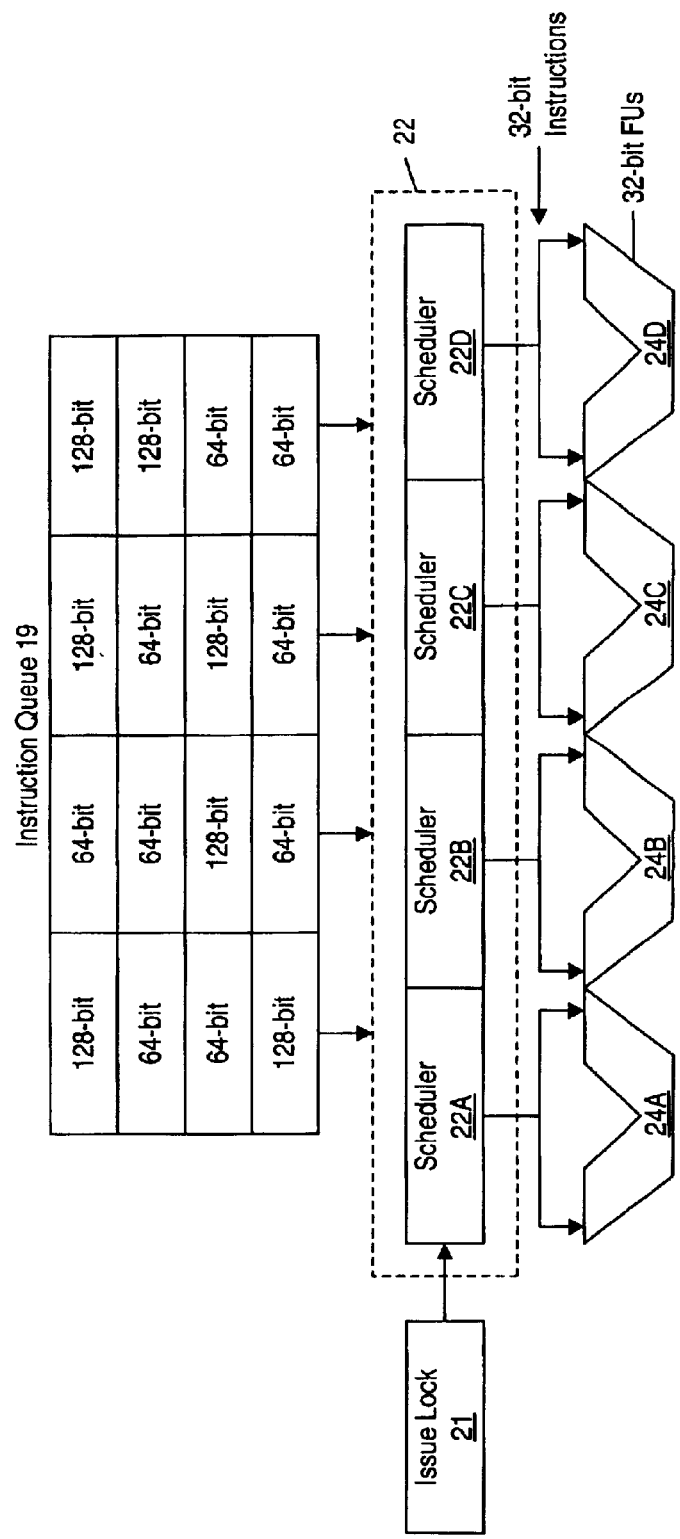
FIG. 3 illustrates a portion of a processor including an instruction queue, scheduler and functional unit, according to another embodiment.

The examples described herein of SIMD instructions and particular data types sizes such as 64-bit SISD data types and 128-bit SIMD data types are merely examples for certain embodiments. Other embodiments may vary, for example FIG. 3 illustrates an embodiment in which execution unit 24 includes four separately schedulable portions 24A, 24B, 24C, and 24D and corresponding scheduler portions 22A, 22B, 22C and 22D. This embodiment may support instructions which operate on data types having a width of only one of the execution unit portions in which case these instructions may be scheduled independently for any execution unit portion. This embodiment may also support vector data types for which the four execution unit portions may be locked together so that vector or SIMD instructions may be scheduled for all four execution unit portions concurrently. For example, the processor may support SISD instructions that operate on 32-bit data types and are independently scheduled in a superscalar manner for individual execution unit portions 24A, 24B, 24C, and 24D, or SIMD instructions for which execution unit portions 24A, 24B, 24C, and 24D may be locked together so that four 32-bit sub-operands of a 128-bite SIMD data type are operated on concurrently. In yet another embodiment the execution unit portions may be scheduled independently to operate on single-wide data types or execution unit portions 24A and 24B may be locked together as a pair and execution unit portions 24C and 24D lock together as a pair to operate on double-wide data types, and all four execution unit portions may be locked together to operate on quad-wide data types. Other embodiments may employ different numbers, sizes, and combinations of functional units that may be scheduled independently or locked together.

Figure 4A:
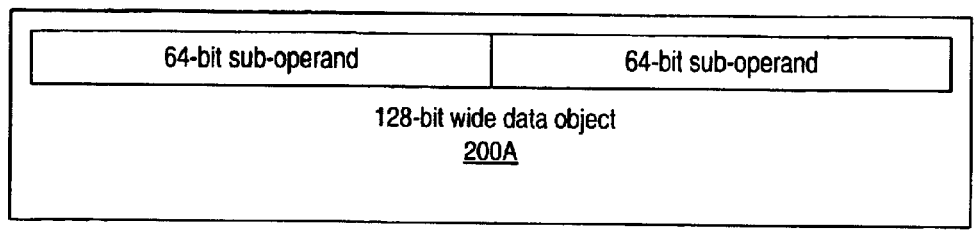
FIG. 4A is a drawing illustrating one embodiment of a data object having a packed or vector data type.

In FIG. 4A, a drawing illustrating one embodiment of a data object having a wide data type is shown. In some embodiments, the data object may be a packed data object or a vector data object. In one embodiment, the data object 200A may be a 128-bit SIMD operand. The wide operand may include 128 bits of data, and may be subdivided into two 64-bit sub-operands. As discussed above, SIMD instruction specifying such a data type may be scheduled atomically for two execution unit portions locked together so that both 64-bit sub-operands are operated on during the same clock cycle. Alternatively, a SIMD instruction specifying such a data type may be scheduled so that the operation on each 64-bit sub-operand is scheduled independently for each execution unit portion (allowing out-of-order execution, etc). SISD instructions specifying 64-bit operands may be scheduled independently for the execution unit portions.

Figure 4B:
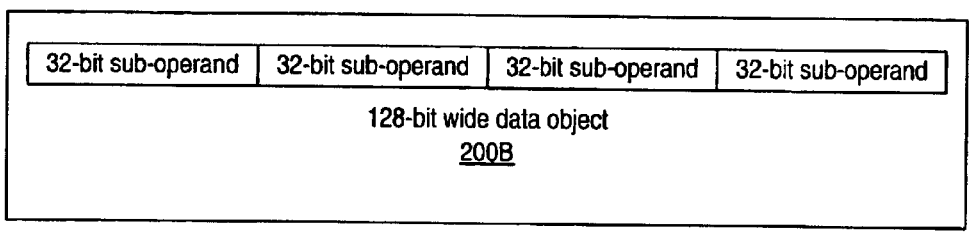
FIG. 4B is a drawing illustrating another embodiment of a data object having a packed or vector data type.

FIG. 4B is a drawing illustrating another embodiment of a data object having a wide data type. In this embodiment, data object 200B may be a SIMD operand including 128 bits of data. In one embodiment of a processor, the execution unit portions may have 32-bit wide data paths to handle SIMD operands in independently schedulable portions and schedule 32-bit SISD instructions, as discussed above. Four execution unit portions may also be locked together to concurrently operate on an atomically scheduled 128-bit SIMD operand.

Figure 5:
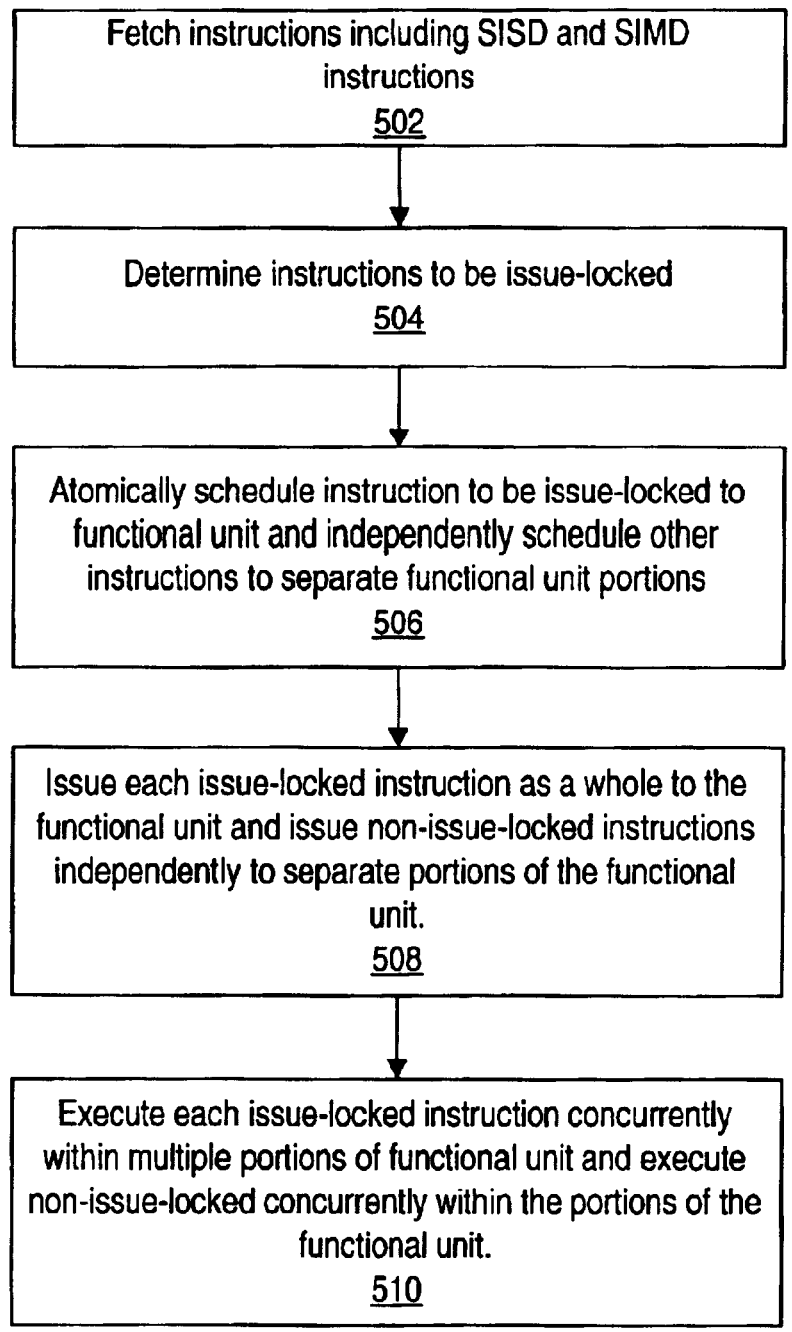
FIG. 5 is an illustration of a method for processing instructions to a functional unit in a processor as either a single atomically scheduled wide functional unit or as multiple independently schedulable functional unit portions, according to one embodiment.

FIG. 5 illustrates a method for processing instructions to a functional unit in a processor as either a single atomically scheduled wide functional unit or as multiple independently schedulable functional unit portions. Program instructions are fetched, e.g. from an instruction cache, as indicated at 502. The instructions specify different operand types. For example, some instructions may be SISD instructions and others may be SIMD instructions. The instructions may be examined to determine instructions to be issue-lock, as indicated at 504. For example, certain SIMD instructions may be issue-locked. Instructions to be issue-locked may be atomically scheduled to a functional unit, as indicated at 506. Non-issue-locked instructions may be independently scheduled to separate portions of the functional unit, as indicated at 506. Each issue-locked instruction is issued as a whole to the functional unit, as indicated at 508. Non-issue-locked instructions are issued independently each to a separate functional unit portion, as indicated at 508. The operands of issue-locked instructions are operated on concurrently in the functional unit as a whole, as indicated at 510. For non-issue-locked instructions, different portions of the functional unit may concurrently execute different non-issue-locked instructions, as indicated at 510. Thus, the functional unit may be scheduled as a single functional unit for issue-locked instructions, or as independent functional unit portions for non-issue-locked instructions.

Figure 6:
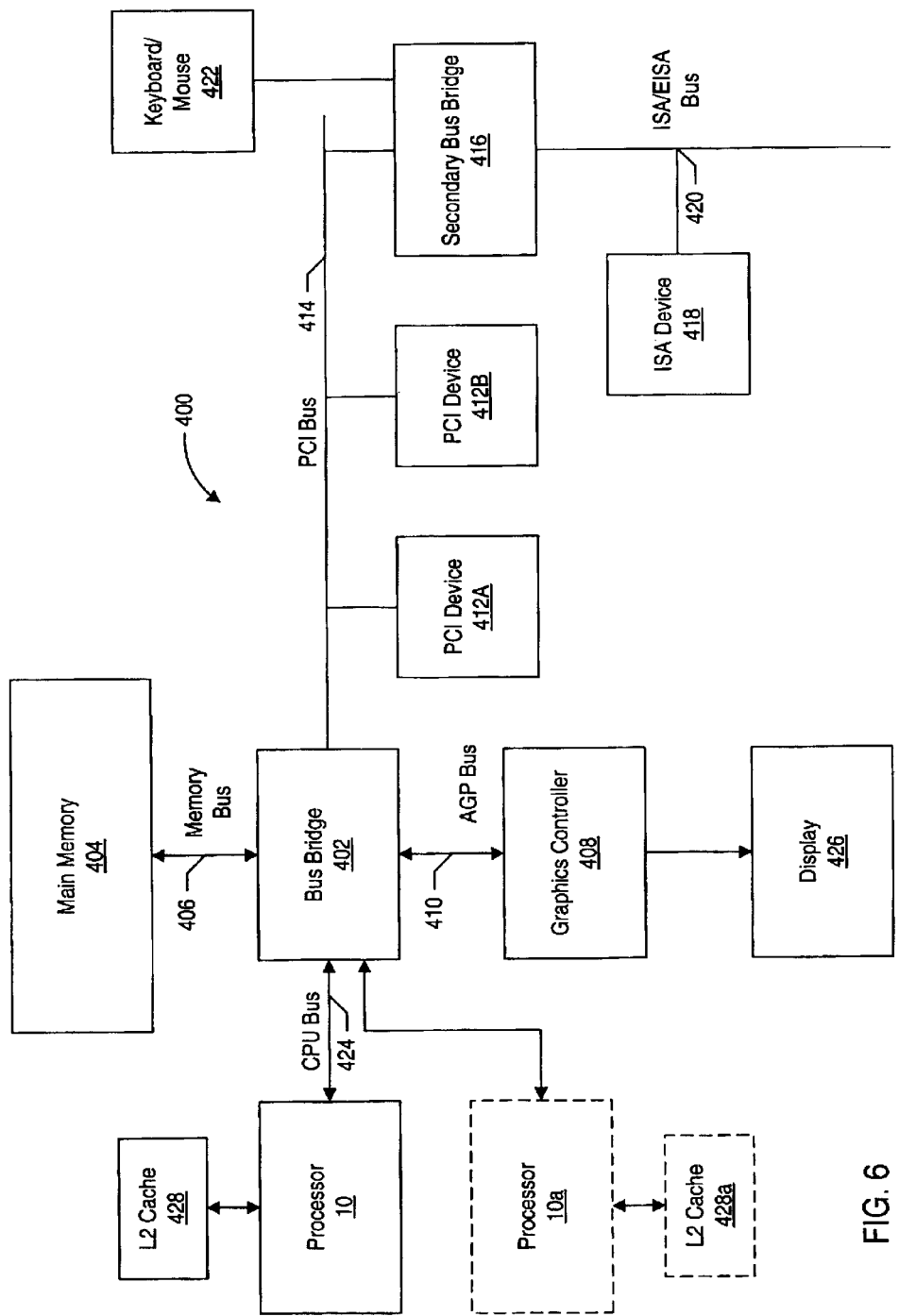
FIG. 6 is a block diagram of a computer system including a processor according to one embodiment.

FIG. 6 shows a block diagram of one embodiment of a computer system 400 that includes a microprocessor 10, such as the processor described above, coupled to a variety of system components through a bus bridge 402. Note that the illustrated embodiment is merely exemplary, and other embodiments of a computer system are possible and contemplated. In the depicted system, a main memory 404 is coupled to bus bridge 402 through a memory bus 406, and a graphics controller 408 is coupled to bus bridge 402 through an AGP bus 410. Several PCI devices 412A–412B are coupled to bus bridge 402 through a PCI bus 414. A secondary bus bridge 416 may also be provided to accommodate an electrical interface to one or more EISA or ISA devices 418 through an EISA/ISA bus 420. In this example, microprocessor 10 is coupled to bus bridge 402 through a microprocessor bus 424 and to an optional L2 cache 428. In some embodiments, the microprocessor 10 may include an integrated L1 cache (not shown).

Bus bridge 402 provides an interface between microprocessor 10, main memory 404, graphics controller 408, and devices attached to PCI bus 414. When an operation is received from one of the devices connected to bus bridge 402, bus bridge 402 identifies the target of the operation (e.g., a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus. Bus bridge 402 may include a memory controller 100 as described above in some embodiments. In other embodiments, certain functionality of bus bridge 402, including that provided by memory controller 100, may be integrated into microprocessors 10 and 10a.

In addition to providing an interface to an ISA/EISA bus for PCI bus 414, secondary bus bridge 416 may incorporate additional functionality. An input/output controller (not shown), either external from or integrated with secondary bus bridge 416, may also be included within computer system 400 to provide operational support for a keyboard and mouse 422 and for various serial and parallel ports. An external cache unit (not shown) may also be coupled to microprocessor bus 424 between microprocessor 10 and bus bridge 402 in other embodiments. Alternatively, the external cache may be coupled to bus bridge 402 and cache control logic for the external cache may be integrated into bus bridge 402. L2 cache 428 is shown in a backside configuration to microprocessor 10. It is noted that L2 cache 428 may be separate from microprocessor 10, integrated into a cartridge (e.g., slot 1 or slot A) with microprocessor 10, or even integrated onto a semiconductor substrate with microprocessor 10.

Main memory 404 is a memory in which application programs are stored and from which microprocessor 10 primarily executes. A suitable main memory 404 includes DRAM (Dynamic Random Access Memory). For example, a plurality of banks of SDRAM (Synchronous DRAM) or Rambus DRAM (RDRAM) may be suitable. Main memory may store program instructions executed by the processor 10.

PCI devices 412A–412B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures that can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional microprocessors (e.g., microprocessor 10a shown as an optional component of computer system 400). Microprocessor 10a may be similar to microprocessor 10. More particularly, microprocessor 10a may be an identical copy of microprocessor 10. Microprocessor 10a may be connected to bus bridge 402 via an independent bus (as shown in FIG. 6) or may share microprocessor bus 224 with microprocessor 10. Furthermore, microprocessor 10a may be coupled to an optional L2 cache 428a similar to L2 cache 428.

Figure 7:
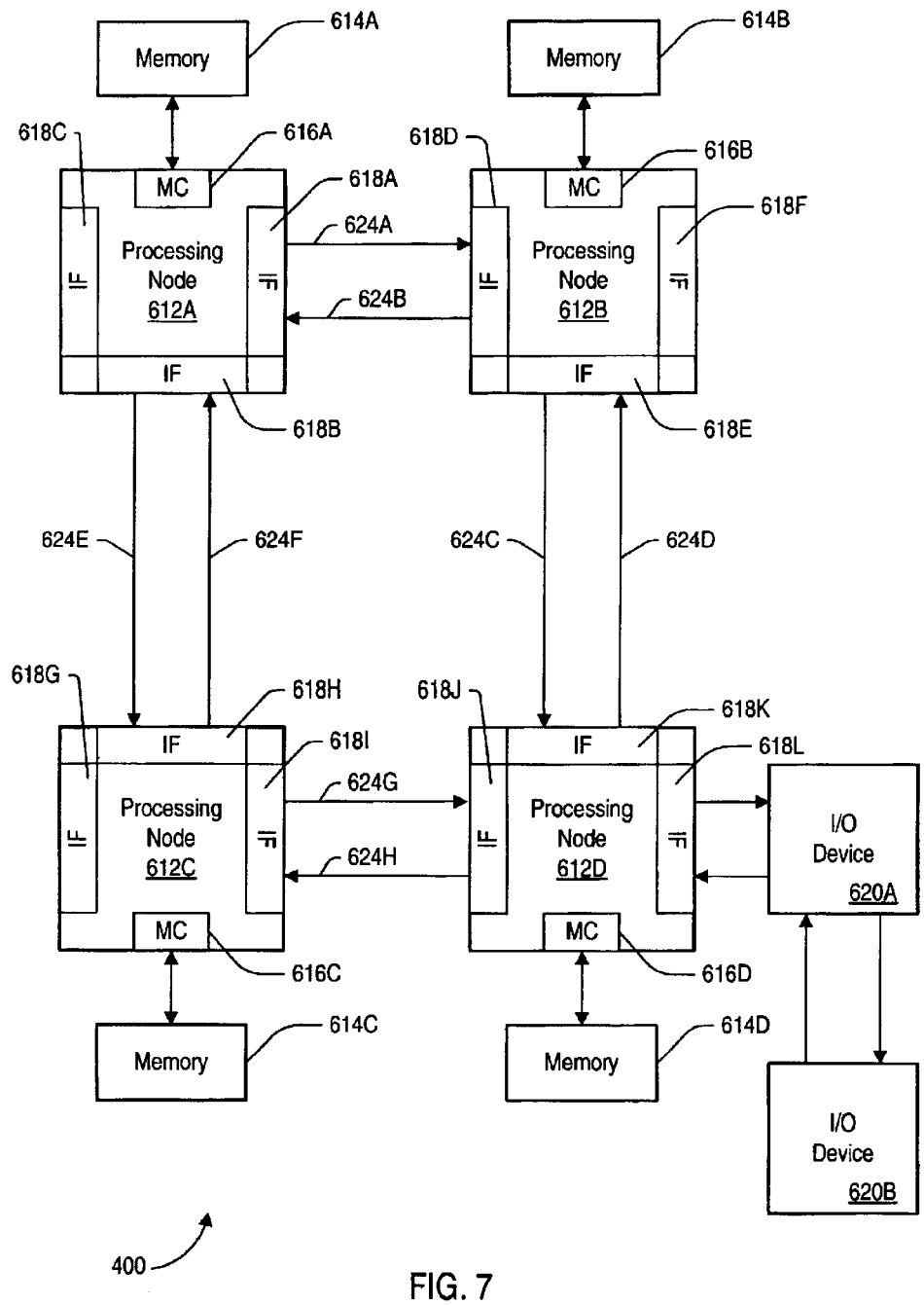
FIG. 7 is a block diagram of a computer system including a processor according to another embodiment.

Turning now to FIG. 7, another embodiment of a computer system 400 that may include a processor 10 as described above is shown. Other embodiments are possible and contemplated. In the embodiment of FIG. 7, computer system 400 includes several processing nodes 612A, 612B, 612C, and 612D. Each processing node is coupled to a respective memory 614A–614D via a memory controller 616A–616D included within each respective processing node 612A–612D. Additionally, processing nodes 612A–612D include interface logic used to communicate between the processing nodes 612A–612D. For example, processing node 612A includes interface logic 618A for communicating with processing node 612B, interface logic 618B for communicating with processing node 612C, and a third interface logic 618C for communicating with yet another processing node (not shown). Similarly, processing node 612B includes interface logic 618D, 618E, and 618F; processing node 612C includes interface logic 618G, 618H, and 618I; and processing node 612D includes interface logic 618J, 618K, and 618L. Processing node 612D is coupled to communicate with a plurality of input/output devices (e.g., devices 620A–620B in a daisy chain configuration) via interface logic 618L. Other processing nodes may communicate with other I/O devices in a similar fashion.

Processing nodes 612A–612D implement a packet-based link for inter-processing node communication. In the present embodiment, the link is implemented as sets of unidirectional lines (e.g., lines 624A are used to transmit packets from processing node 612A to processing node 612B and lines 624B are used to transmit packets from processing node 612B to processing node 612A). Other sets of lines 624C–624H are used to transmit packets between other processing nodes, as illustrated in FIG. 7. Generally, each set of lines 624 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 612A to processing node 612D may pass through either processing node 612B or processing node 612C, as shown in FIG. 7. Any suitable routing algorithm may be used. Other embodiments of computer system 400 may include more or fewer processing nodes then the embodiment shown in FIG. 7.

Generally, the packets may be transmitted as one or more bit times on the lines 624 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 612A–612D, in addition to a memory controller and interface logic, may include one or more microprocessors. Broadly speaking, a processing node includes at least one microprocessor and may optionally include a memory controller for communicating with a memory and other logic as desired. More particularly, each processing node 612A–612D may include one or more copies of microprocessor 10 (as described above). Interface unit 37 may includes the interface logic 618 within the node, as well as the memory controller 616.

Memories 614A–614D may include any suitable memory devices. For example, a memory 614A–614D may include one or more RAMBUS DRAMs (RDRAMs), synchronous DRAMs (SDRAMs), static RAM, etc. Memories 614 may include program instructions executable by the processing nodes 612. The address space of computer system 400 is divided among memories 614A–614D. Each processing node 612A–612D may include a memory map used to determine which addresses are mapped to which memories 614A–614D, and hence to which processing node 612A–612D a memory request for a particular address should be routed. In one embodiment, the coherency point for an address within computer system 400 is the memory controller 616A–616D coupled to the memory storing bytes corresponding to the address. In other words, the memory controller 616A–616D is responsible for ensuring that each memory access to the corresponding memory 614A–614D occurs in a cache coherent fashion. Memory controllers 616A–616D may include control circuitry for interfacing to memories 614A–614D. Additionally, memory controllers 616A–616D may include request queues for queuing memory requests.

Interface logic 618A–618L may include a variety of buffers for receiving packets from the link and for buffering packets to be transmitted upon the link. Computer system 400 may employ any suitable flow control mechanism for transmitting packets. For example, in one embodiment, each interface logic 618 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 620A–620B may be any suitable I/O devices. For example, I/O devices 620A–620B may include devices for communicate with another computer system to which the devices may be coupled (e.g., network interface cards or modems). Furthermore, I/O devices 620A–620B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A processor, comprising:
   an instruction scheduler configured to receive instructions and schedule the instructions for issuance, wherein said instructions comprise first instructions specifying a first data type having a first bit-width and second instructions specifying a second data type having a second bit-width;
   a functional unit configured to receive instructions issued from said scheduler and to perform an operation according to each issued instruction, wherein said functional unit comprises a plurality of functional unit portions, wherein each functional unit portion is configured to operate on operands of said first data type, and wherein said plurality of functional unit portions are configured to be locked together to operate on operands of said second data type;
   wherein said scheduler is configured to independently schedule said first instructions to separate ones of said plurality of functional unit portions, to atomically schedule a first one of said second instructions to said functional unit with the plurality of functional unit portions locked together to operate concurrently on an operand of said first one of said second instructions, and to independently schedule a second one of said second instructions to said functional unit, wherein said plurality of functional unit portions are configurable to operate non-concurrently on portions of an operand of said second one of said second instructions.

2. The processor as recited in claim 1, wherein said first instructions comprise single instruction single data (SISD) instructions, and wherein said second instructions comprise single instruction multiple data (SIMD) instructions.

3. The processor as recited in claim 2, wherein said SIMD instructions specify an operand of said second data type comprising a plurality of sub-operands of said first data type.

4. The processor as recited in claim 3, wherein said scheduler is configured to atomically schedule one of said SIMD instructions to said functional unit with the plurality of functional unit portions locked together when the SIMD instruction is issued so that each sub-operand of the SIMD operand is concurrently operated on by one of the plurality of functional unit portions.

5. The processor as recited in claim 3, wherein said scheduler is configured to independently schedule one of said SIMD instructions to said plurality of functional unit portions so that each sub-operand of the SIMD operand is independently operated on by one of the plurality of functional unit portions.

6. The processor as recited in claim 1, wherein each functional unit portion is an execution unit configured to perform one or more arithmetic operations on one or more operands of said first data type.

7. The processor as recited in claim 1, wherein each functional unit portion is a load/store unit configured to perform load or store operations on one or more operands of said first data type.

8. The processor as recited in claim 1, further comprising:
   an instruction queue/decode unit configure to determine which instructions are ones of said second instructions to be atomically scheduled, wherein said instruction queue/decode unit is configured to activate an issue lock mechanism for ones of said second instructions to be atomically scheduled;
   wherein said scheduler is configured to issue said second instructions for which said issue lock is activated to each of said plurality of functional unit portions in the same clock cycle.

9. A method for scheduling instructions in a processor, comprising:
   fetching instructions comprising first instructions specifying a first data type having a first bit-width and second instructions specifying a second data type having a second bit-width;
   scheduling the instructions for issuance to a functional unit comprising a plurality of functional unit portions, wherein said scheduling comprises independently scheduling said first instructions to separate ones of the plurality of functional unit portions, atomically scheduling a first one of said second instructions to the functional unit with the plurality of functional unit portions locked together, and independently scheduling a second one of said second instructions to said functional unit; and
   performing an operation according to each instruction issued to the functional unit; wherein, for said first instructions, said performing comprises each functional unit portion independently operating on operands of said first instructions; wherein, for said first one of said second instructions, said performing comprises locking the plurality of functional unit portions together to operate concurrently on an operand of said first one of said second instructions; and wherein, for said second one of said second instructions, said performing comprises said plurality of functional unit portions operating non-concurrently on portions of an operand of said second one of said second instructions.

10. The method as recited in claim 9, wherein said first instructions comprise single instruction single data (SISD) instructions, and wherein said second instructions comprise single instruction multiple data (SIMD) instructions.

11. The method as recited in claim 10, wherein said SIMD instructions specify an operand of said second data type comprising a plurality of sub-operands of said first data type.

12. The method as recited in claim 11, wherein said scheduling comprises atomically scheduling one of said SIMD instructions to said functional unit with the plurality of functional unit portions locked together when the SIMD instruction is issued so that each sub-operand of the SIMD operand is concurrently operated on by one of the plurality of functional unit portions.

13. The method as recited in claim 11, wherein said scheduling comprises independently scheduling one of said SIMD instructions to said plurality of functional unit portions so that each sub-operand of the SIMD operand is independently operated on by one of the plurality of functional unit portions.

14. The method as recited in claim 9, wherein said performing comprises performing one or more arithmetic operations on one or more operands of said first data type in an execution unit.

15. The method as recited in claim 9, wherein said performing comprises performing load or store operations on one or more operands of said first data type in a load/store unit.

16. The method as recited in claim 9, further comprising:
determining which instructions are ones of said second instructions to be atomically scheduled;
activating an issue lock mechanism for ones of said second instructions to be atomically scheduled; and
issuing said second instructions for which said issue lock is activated to each of said plurality of functional unit portions in the same clock cycle.

17. A computer system, comprising:
a system memory configured to store program instructions;
a processor coupled to said system memory, comprising:
an instruction scheduler configured to receive instructions derived from the program instructions and schedule the instructions for issuance, wherein said instructions comprise first instructions specifying a first data type having a first bit-width and second instructions specifying a second data type having a second bit-width;
a functional unit configured to receive instructions issued from said scheduler and to perform an operation according to each issued instruction, wherein said functional unit comprises a plurality of functional unit portions, wherein each functional unit portion is configured to operate on operands of said first data type, and wherein said plurality of functional unit portions are configured to be locked together to operate on operands of said second data type;
wherein said scheduler is configured to independently schedule said first instructions to separate ones of said plurality of functional unit portions, to atomically schedule a first one of said second instructions to said functional unit with the plurality of functional unit portions locked together to operate concurrently on an operand of said first one of said second instructions, and to independently schedule a second one of said second instructions to said functional unit, wherein said plurality of functional unit portions are configurable to operate non-concurrently on portions of an operand of said second one of said second instructions.

18. The computer system as recited in claim 17, wherein said first instructions comprise single instruction single data (SISD) instructions, and wherein said second instructions comprise single instruction multiple data (SIMD) instructions.

19. The computer system as recited in claim 18, wherein said SIMD instructions specify an operand of said second data type comprising a plurality of sub-operands of said first data type.

20. The computer system as recited in claim 19, wherein said scheduler is configured to atomically schedule one of said SIMD instructions to said functional unit with the plurality of functional unit portions locked together when the SIMD instruction is issued so that each sub-operand of the SIMD operand is concurrently operated on by one of the plurality of functional unit portions.

21. The computer system as recited in claim 19, wherein said scheduler is configured to independently schedule one of said SIMD instructions to said plurality of functional unit portions so that each sub-operand of the SIMD operand is independently operated on by one of the plurality of functional unit portions.

22. The computer system as recited in claim 17, wherein each functional unit portion is an execution unit configured to perform one or more arithmetic operations on one or more operands of said first data type.

23. The computer system as recited in claim 17, wherein each functional unit portion is a load/store unit configured to perform load or store operations on one or more operands of said first data type.

24. The computer system as recited in claim 17, further comprising:
an instruction queue/decode unit configure to determine which instructions are ones of said second instructions to be atomically scheduled, wherein said instruction queue/decode unit is configured to activate an issue lock mechanism for ones of said second instructions to be atomically scheduled;
wherein said scheduler is configured to issue said second instructions for which said issue lock is activated to each of said plurality of functional unit portions in the same clock cycle.

* * * * *